United States Patent [19]

McInerney

[11] 4,253,242

[45] Mar. 3, 1981

[54] DIGITAL ANGLE INDICATOR

[76] Inventor: Terrance M. McInerney, P.O. Box 98201, Atlanta, Ga. 30359

[21] Appl. No.: 163,356

[22] Filed: Jun. 26, 1980

Related U.S. Application Data

[63] Continuation of Ser. No. 951,151, Oct. 13, 1978, abandoned.

[51] Int. Cl.³ .............................................. G01C 9/06
[52] U.S. Cl. ..................................................... 33/366
[58] Field of Search ......................................... 33/366

[56] References Cited

U.S. PATENT DOCUMENTS

| | | | |
|---|---|---|---|
| 2,777,070 | 1/1957 | Stamper et al. | 33/366 X |
| 3,657,551 | 4/1972 | Lingert et al. | 33/366 X |
| 3,776,315 | 12/1973 | Gille et al. | 33/366 X |
| 4,079,521 | 3/1978 | Uhorczak | 33/366 |
| 4,159,577 | 7/1979 | Bergkvist | 33/366 |

FOREIGN PATENT DOCUMENTS 2374617  8/1978  France ........................................ 33/366

*Primary Examiner*—Charles E. Phillips
*Attorney, Agent, or Firm*—Jones, Thomas & Askew

[57] ABSTRACT

A digital angle indicator for the measurement of predetermined angles. The indicator comprises a rotatably mounted gravity responsive opaque rotor having transparent slots therein for selectively passing light from light sources to light detectors, said light detectors being connected to a plurality of visual indicators through a digital logic circuit for activating said visual indicators in response to said light detectors. The visual indicators provide an indication of the attainment of the angle being measure and values greater or lesser than the desired angle.

11 Claims, 6 Drawing Figures

DIGITAL ANGLE INDICATOR

The present invention relates to an angle finding apparatus having digital indication of several predetermined angles and of both lesser and greater deviations therefrom.

For many years it has been known to use what is commonly known as a carpenter's level to measure vertical and horizontal angles. Such devices generally employ an arcuate tube partially filled with a liquid so as to provide an air bubble therein. The carpenter's level is used by placing the frame of the level on the object to be measured, and then adjustments are made in the angular orientation of the level until the bubble in the arcuate tube centers, usually between two indicia placed on the tube, thereby indicating either a horizontal or vertical angle. Furthermore, indications of angles either greater or lesser than the desired angle are indicated by observing which side of the indicia the bubble rests when it is not centered.

This type of prior device has the problem of requiring the visual judgment of the user to determine when the air bubble has centered. This is often difficult when the angle being measured requires an unusual attitude of the level, thereby placing the air bubble at an inconvenient viewing angle or distance. It is therefore desirable to provide an angle indicating device which provides a digital indication rather than an analogue indication as with the liquid filled tube devices.

It is known to construct a carpenter's level using an electrical indication of when the desired angle is attained. See, for example, Richards, U.S. Pat No. 3,196,552 and Adams, U.S. Pat. No. 4,003,134. However, neither of these prior devices provide any digital indication of whether the level is at an angle which is lesser or greater than the desired angle. This is an inherent limitation in these devices because they both use a single mercury switch to energize their single indicator. Other examples of prior-art electrical levels have used electrical switches which rely on physical contact with a gravity responsive element, but the inherent friction of such devices adversely affects their accuracy.

SUMMARY OF THE INVENTION

Generally, the present invention relates to angle indicating apparatus. More particularly, the present invention relates to a digital angle indicator which indicates predetermined angles and angles greater and lesser thereto.

This is achieved by using optical detectors and a gravity responsive rotor that functions as a shutter to selectively permit light to be detected by the optical detectors depending upon the orientation of the rotor with respect to the detectors. The signal leaving the optical detectors is then passed through a logic circuit which activates optical indicators on the outer casing of the apparatus. Depending on the indicator or combination of indicators which are activated, the apparatus will give indications of vertical and horizontal angles, angles of 45 degrees thereto, and angles greater or lesser than the aforementioned.

Accordingly, it is an object of the present invention to provide an improved angle indicating device.

Another object of the present invention is to provide a digital angle indicator.

A further object of the present invention is to provide a digital angle indicastor which will indicate whether the angle being measured is greater or lesser than the desired angle.

Yet another object of the present invention is to provide a digital angle indicator which will measure both vertical and horizontal angles and angles of 45 degrees thereto.

These and other objects, features and advantages of the present invention will become apparent upon a review of the following detailed description of the disclosed embodiment and the appended drawing and claims.

DETAILED DESCRIPTION OF THE DISCLOSED EMBODIMENT

Figure 1:
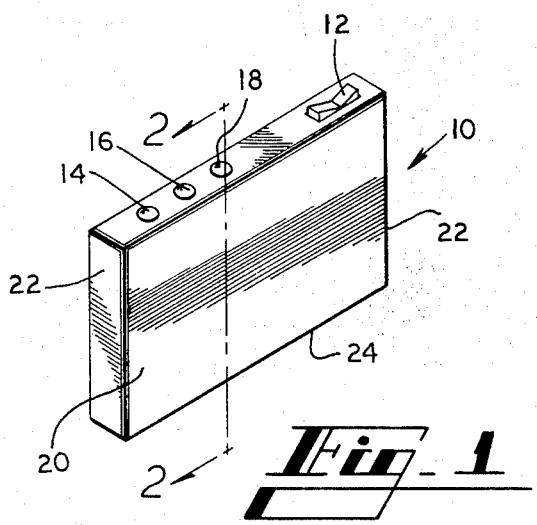
FIG. 1 is a plan view of a disclosed embodiment of the digital angle indicator of the present invention.
Figure 3:
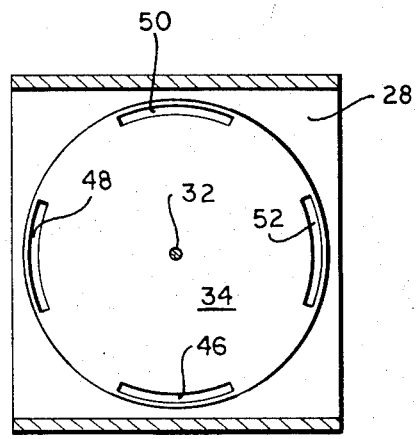
FIG. 3 is a cross-sectional drawing taken along the line 3—3 of the digital angle indicator shown in FIG. 2.
Figure 4:
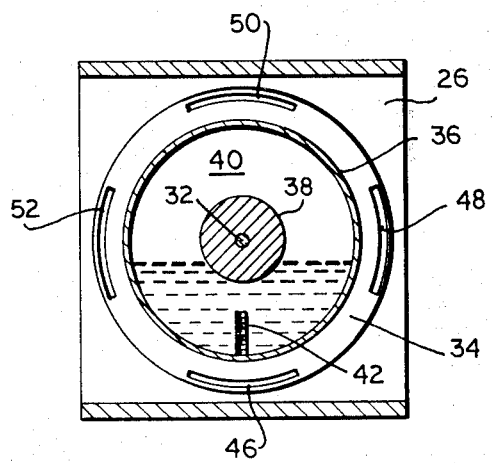
FIG. 4 is a cross-sectional drawing taken along the line 4—4 of the digital angle indicator shown in FIG. 2.

Referring now to the drawing in which like numbers indicate like elements, it will be seen that there is a digital angle indicator 10 of a generally rectangular shape having a conventional rocker-type on off power switch 12 and three indicators 14, 16 and 18 arranged in a straight line. The indicators may be light-emitting diodes (LEDs) liquid crystal indicators, or the like. The outer casing 20 of the angle indicator 10 has two substantially planar vertical contacting surfaces 22 which are orthogonal to a substantially planar horizontal contacting surface 24. These contacting surfaces 22, 24 are designed to be butted against the object whose angle is being measured. In this manner the angular orientation of the casing 20 duplicates that of the object being measured.

Inside the casing 20 are two mounting brackets 26, 28. Attached to each bracket 26, 28 are jewel bearings 30a and 30b. Extending between the jewel bearings 30a and 30b and adapted for low frictional rotation therebetween is a pivot pin 32. Mounted on the pivot pin 32 and adapted for rotation therewith is a rotor 34 made of a substantially opague material. Attached to the rotor 34 and also adapted for rotation with the pivot pin 32 and the rotor is a disk 36 having a central core 38 and a hollow annular chamber 40. A ballast screw 42 extends through a hole 44 in the edge 46 of the disk 36. The ballast screw 42 serves two functions. When the ballast screw 42 is removed, the annular chamber 40 may be partially filled with a liquid for a purpose described below. When the ballast screw 42 is replaced, it displaces the center of mass of the disk 36 from its axis of rotation about the pivot pin 32. In this manner, the disk 36 and rotor 34 will always seek a particular orientation with respect to a gravitational field. For example, when the contacting surface 24 is placed on an object, the casing 20 and the mounting brackets 26, 28 will assume the angle of the object, but the rotor 34 and the disk 36 will always seek an angular orientation such that the center of mass of the rotor 34 and disk 36 is at its lowest point with respect to the gravitational field.

Since the pivot pin 32 is mounted on jewel bearings 30, rotation of the rotor 34 and disk 36 may be achieved by the application of very small forces. Therefore, when the center of mass of the rotor 34 and disk 36 is displaced from its lowest point with respect to the gravitational field, the disk and rotor will oscillate back and forth in a pendulum-type motion for a period of time seeking realignment with the gravitational field. The liquid which partially fills the annular chamber 40 tends to damp the oscillation of the disk 36 and the rotor 34 by providing shear forces against the interior surfaces of the disk which contact the liquid. Choice of the liquid used in the chamber 40 is based on the degree of damping needed. It is found that isopropyl alcohol is a liquid suitable for such use, although it is specifically contemplated that other liquids may work equally well.

Figure 5:
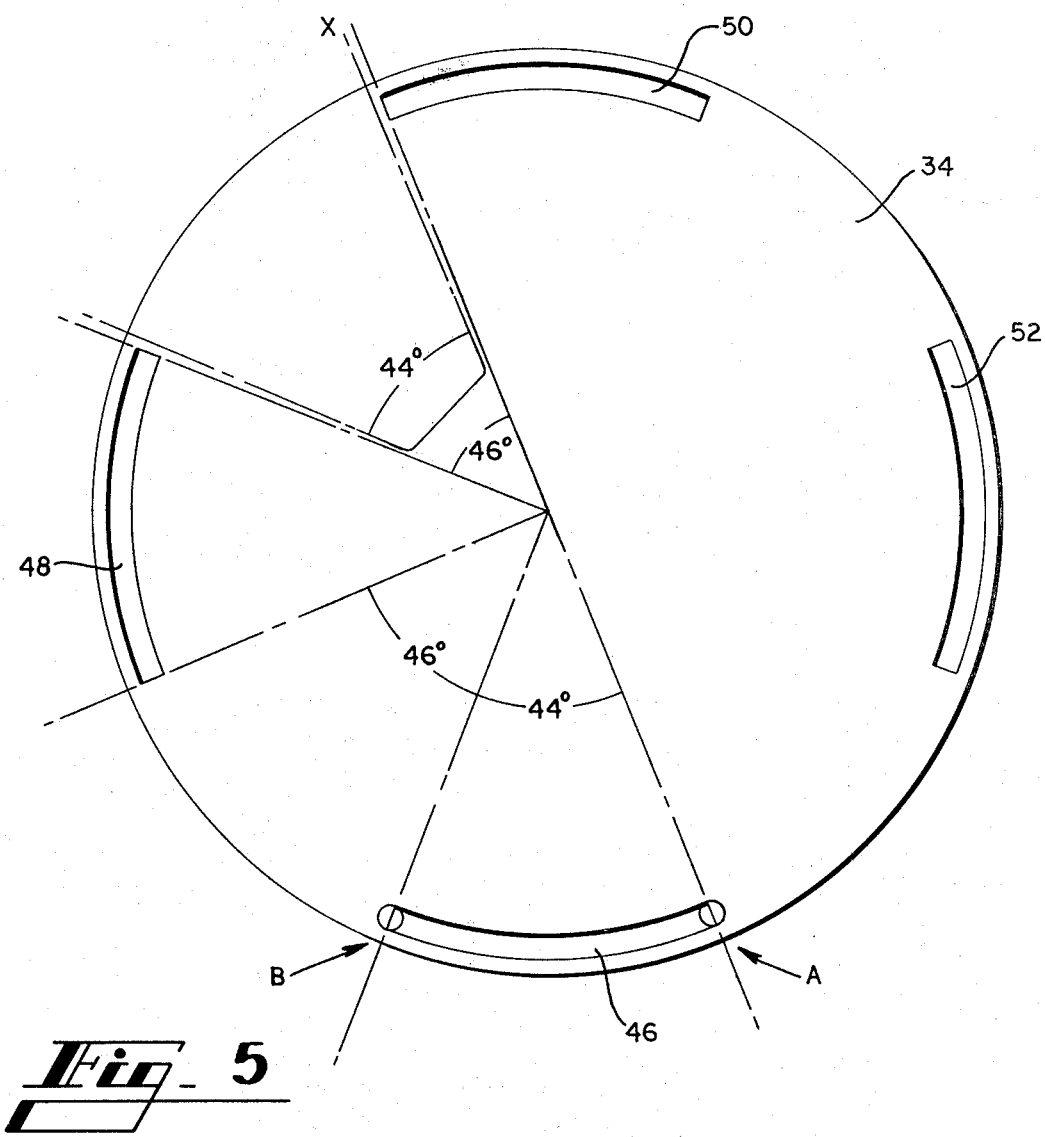
FIG. 5 is a detailed view of the rotor of the digital angle indicator shown in FIG. 3.

As best shown in FIG. 5, the outer portion of the rotor 34 has four arcuate slots 46, 48, 50, 52 cut therein and disposed in a particular angular relationship to each other and to the alignment of the rotor with respect to a gravitational field. Each slot 46, 48, 50, 52 has an arc length of 44° and is spaced from each adjacent slot by an arc length of 46°. Although the present invention is illustrated as having an opaque rotor having slots cut therein, it is specifically contemplated that other methods may be used to provide transparent slots, such as by providing a rotor of a clear material and having an opague mask painted thereon so as to provide four transparent areas. In addition to the arc lengths of the slots 46, 48, 50, 52 and the spacing of the adjacent arcs from each other, the mid-point of the length of the arc 46 is intersected by an imaginary plane perpendicular to the rotor 34 and passing through the axis of rotation of the rotor and through the center of mass of the rotor and disk 36. In this way, after the oscillations of the rotor 34 have stopped, the slots 46-52 will always be in the same orientation with respect to a gravitational field.

Figure 2:
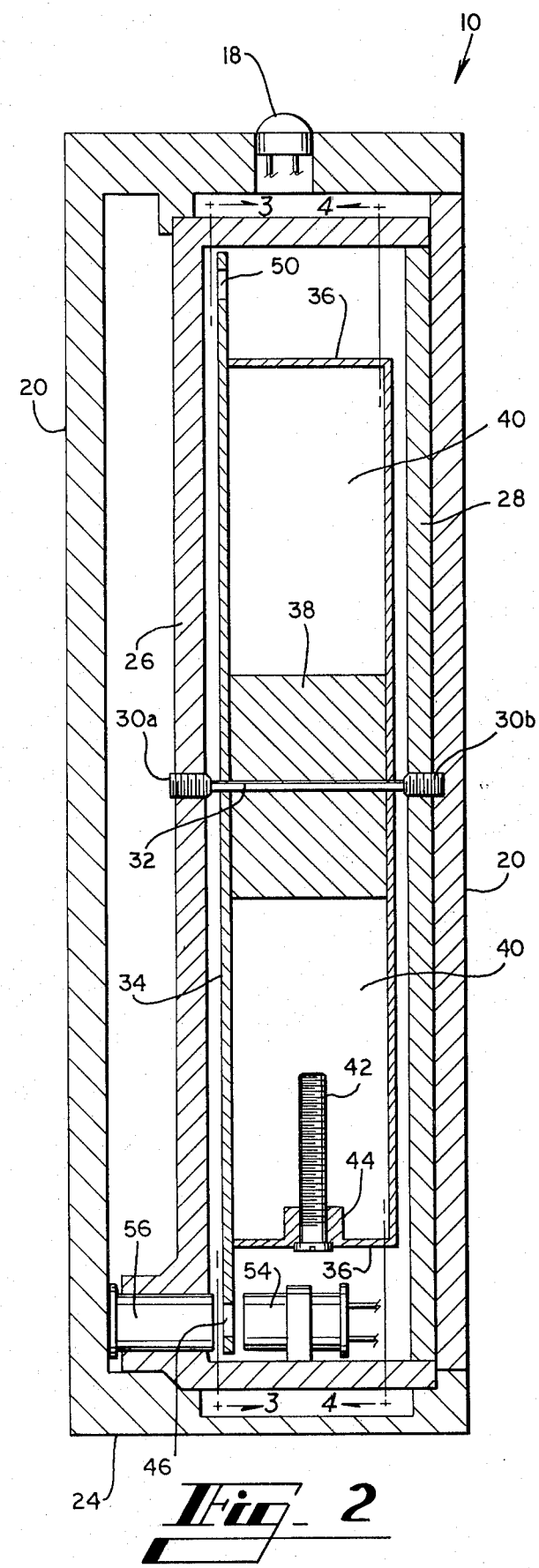
FIG. 2 is a cross-sectional drawing taken along the line 2—2 of the digital angle indicator shown in FIG. 1.

Attached to the mounting bracket 26 are two light detectors A, B, each comprising a light emitting diode 54 and photoelectric cell 56 as shown by example in FIG. 2. Each light emitting diode 54 is located directly opposite its corresponding photoelectric cell 56 with the edge of the rotor 34 passing between the two so that the slots 46-52 act as shutters selectively permitting light from the light emitting diodes to be detected by the corresponding photoelectric cells.

The light detectors A, B are disposed on the mounting bracket 26 such that the end-points of the slot 46 lie directly over light detector A and light detector B whenever the contacting surface 24 is parallel to a horizontal plane. Additionally, light detector B is separated from light detector A by an arc length measured about the axis of rotation of the rotor 34 of 44°.

Each light emitting diode 54 is connected through an electrical circuit to a power supply, such as a dry cell battery (not shown), so that light is continuously emitted from each light emitting diode 54 when the switch 12 is turned on. Each photoelectric cell 56 is connected through an electric circuit to a digital logic circuit which in turn selectively activates an appropriate one or more of the indicators 14-18 to indicate that the desired angle is attained or that the device is off-level in one direction or in the other. Such digital logic circuits are well known in the art and in the present invention are adapted to provide a visual display on the indicators 14-18 corresponding to signals supplied by the light detectors A, B as set out more fully hereinafter.

Figure 6:
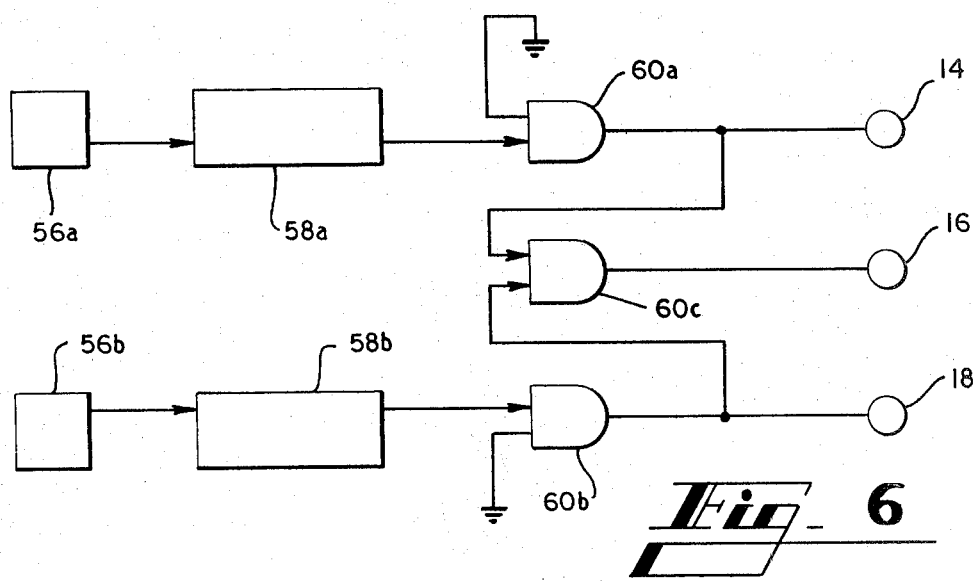
FIG. 6 is a schematic diagram of a digital logic circuit useful with the digital angle indicator shown in FIG. 1.

FIG. 6 shows a typical logic circuit for use in an angle indicator of the present invention which utilizes a pair of photoelectric cells 56A, 56B. The photocells 56A, 56B produce a potential only when they detect light. Since the potential is usually dependent upon the intensity of the light striking the photocell, the potential from each photocells 56A, 56B is sent to a conventional Schmitt trigger circuit 58A, 58B which is well known in the art. The output of each Schmitt trigger circuit 58A, 58B is sent to a conventional NAND circuit 60A, 60B which is also well known in the art. The output of one NAND circuit 60A is connected to the indicator 14 and the output of the other NAND circuit 60B is connected to the indicator 18. Additionally, the output of each NAND circuit 60A, 60B is connected to the input of a third NAND circuit 60C. The output of the NAND circuit 60C is then connected to the indicator 16.

It will therefore be appreciated by those skilled in the art that when light is detected by both of the photocells 56A, 56B, only the center indicator 16 will be activated. Similarly, when light is detected by only the photocell 56A, only the end indicator 14 is activated; when light is detected by only the photocell 56B, only the end indicator 18 is activated; and when neither photocell 56A, 56B detect light, both of the indicators 14, 18 are activated. FIG. 6 therefore illustrates a typical logic circuit useful in the present invention.

In operation either the vertical contacting surfaces 22 or the horizontal contacting surface 24 may be used in measuring angles; however, for the following illustration all measurements are made with respect to the horizontal contacting surface. Initially the horizontal contacting surface is placed in an orientation parallel to a horizontal plane. This orientation will be designated 0°. The angle between the horizontal plane and the horizontal contacting surface 24 is then increased in 45° increments. As the angle of the horizontal contacting surface 24 is increased the rotor 34 remains oriented in the same position with respect to the gravitational field and thus alternately blocks and permits light from the light emitting diodes 54 to pass through the slots 46-52. Therefore, different photoelectric cells 56 detect light from the corresponding light emitting diode 54 depending on the orientation of the rotor 34 with respect to the horizontal contacting surface 24. The indications provided by the indicators 14-18 are provided by the logic circuit (not shown) based on the light detected by the light detectors A, B as shown by the table below:

| Angle Degrees from Horizontal | Light Detected By | | Visual Indication | | |
|---|---|---|---|---|---|
| | A | B | 14 | 16 | 18 |
| 0° | Yes | Yes | No | Yes | No |
| >0°, <45° | No | Yes | Yes | No | No |
| 45° | No | No | Yes | No | Yes |
| >45°, <90° | Yes | No | No | No | Yes |
| 90° | Yes | Yes | No | Yes | No |
| >90°, <135° | No | Yes | Yes | No | No |
| 135° | No | No | Yes | No | Yes |
| >135°, <180° | Yes | No | No | No | Yes |
| 180° | Yes | Yes | No | Yes | No |
| >180°, <225° | No | Yes | Yes | No | No |
| 225° | No | No | Yes | No | Yes |
| >225°, <270° | Yes | No | No | No | Yes |
| 270° | Yes | Yes | No | Yes | No |
| >270°, <315° | No | Yes | Yes | No | No |
| 315° | No | No | Yes | No | Yes |

Summarizing the data above, it will be seen that when angles of 0°, 180° and 270° are measured, light is only detected by light detectors A and B which thereby results in a visual indication at the middle indicator 16 only. When angles of 45°, 135°, 225° and 315° are measured, light is not detected by light detectors A and B which thereby results in a visual indication at both the end indicators 14, 18 only. Angles greater or lesser than these angles are indicated by a visual indication of either the indicator 14 or the indicator 18, thereby informing the user that the surface under inspection does not have the desired angular alignment.

Although the present invention is shown as being able to measure multiples of angles of 90° and 45°, it is specifically contemplated that measurements of other angles may be made by varying the arc length and separation of the slots in the rotor and by varying the number and spacing of the light detectors.

It should also be understood that the specific disclosed dimensions of the rotor and the several slots are by way of example only. Moreover, the amount of angular deviation which is permitted from a nominal desired position (e.g., 0°) while maintaining the corresponding illuminated visual indication is determined by the extent to which the slots (e.g. slot 46) angularly overlaps the corresponding detectors (e.g., A and B), and is a matter of design choice.

Furthermore, although the present invention is shown as having visual indicators 14–18, it is specifically contemplated that other means for indicating measurement of angles may be used. Such other means would include, for example, an audible signal. The audible signal could present a certain tone for measurement of an angle and different tones for angles greater or lesser than the angle. Alternately, the rate of an intermittent tone could be varied to indicate the measurement of an angle with greater or lesser rates corresponding to greater or lesser angles measured from the desired angle. Appropriate changes in the digital logic circuit would be required to accommodate different types of indicators, but such circuits are known in the art.

It should be understood, of course, that the foregoing relates only to a preferred embodiment of the present invention and that numerous modifications or alterations may be made therein without departing from the spirit and the scope of the invention as set forth in the appended claims.

What is claimed is:

1. Digital angle indicator apparatus comprising:
   a housing;
   gravity responsive means rotatably mounted about an axis in said housing and defining a plurality of light transmissive areas therethrough mutually spaced from each other and radially spaced from said axis for selectively passing light therethrough;
   at least one pair of light emitter means spaced from said axis at distances corresponding to the distance at which the light transmissive areas of said gravity responsive means are spaced from said axis for emitting light through the light transmissive areas of said gravity responsive means;
   at least one pair of light detector means for detecting light from said light emitter means which passes through the light transmissive areas of said gravity responsive means when said light transmissive areas are aligned with said light emitter means;
   a plurality of indicator means for providing indications of measurements of predetermined angles, angles greater then the predetermined angles and an angle less than the predetermined angles;
   adjacent ones of said light transmissive areas being separated by a first angular arc relative to said axis of rotation;
   said pair of light detector means being separated by a second angular arc less than said first angular arc, so that neither detector means detects any light through said light transmissive means when said gravity responsive means is rotated to a certain angular position between said adjacent light transmissive areas; and
   means responsive to said pair of light detector means for activating said indicator means, whereby measurements of a plurality of predetermined first angles between the housing and the gravity responsive means are indicated in response to an illumination condition detected by both of said pair of light detector means when one of said light transmissive areas is aligned with a pair of light detector means, measurements of angles greater than the predetermined angles are indicated in response to an illumination condition detected when one of said light transmissive areas is disposed so that illumination is detected only by one light detector means of said pair of light detector means, measurements of angles less than the predetermined angles are indicated in response to an illumination condition detected when one of said light transmissive areas is disposed so that illumination is detected only by the other light detector means of said pair of light detector means, and measurement of at least one predetermined second angle in predetermined relation between said first angles is indicated in response to the absence of an illumination condition detected when said pair of light detector means is at said certain angular position between adjacent light transmissive areas.

2. Digital angle indicator apparatus of claim 1, wherein said gravity responsive means further comprises means for damping the rotation of said means.

3. Digital angle indicator apparatus of claim 2, wherein said means for damping rotation comprises a chamber attached to said gravity responsive means, said chamber being at least partially filled with a viscous liquid.

4. Digital angle indicator apparatus of claim 1, wherein said plurality of indicator means comprises three visual indicator means.

5. Digital angle indicator apparatus of claim 1, wherein said gravity responsive means comprises:
   rotor means rotatably mounted between said light emitter means and said light detector means; and
   at least one slot in said rotor means, said slot extending circumferentially around a portion of said rotor means such that light from said light emitter means may selectively pass through said slot for detection by said light detector means.

6. Digital angle indicator apparatus of claim 5, wherein said gravity responsive means further comprises at least one weight attached to said rotor means such that the center of mass of said rotor means does not coincide with its axis of rotation.

7. Ditigal angle indicator apparatus comprising:
   a housing;

a disc freely rotatably mounted about an axis in said housing;

a first light transmissive area disposed on said disc and spaced radially from said axis, said first light transmissive area being defined by an arcuate opening in said disc;

a pair of light emitter means disposed to direct light toward said gravity responsive means;

a pair of light detecting means carried by said housing for detecting light from said light emitter means which is transmitted by said light transmissive areas, said light emitter means being circumferentially spaced from each other a distance equal to or less than the arc length of said opening such that both of said light detecting means detect light from said light emitter means transmitted from said first light transmissive area when said gravity responsive means is in a first orientation with respect to said housing;

a second light transmissive area disposed on said disc and spaced radially from said axis a distance equal to the distance which said first light transmissive area is spaced from said axis, said second light transmissive area being angularly spaced from said first light transmissive area such that said disc blocks light from both of said light detecting means when said gravity responsive means is in a second orientation with respect to said housing and such that both of said light detecting means detect light from said light emitter means transmitted from said second light transmissive area when said gravity responsive means is in a third orientation with respect to said housing; and indicator means operatively associated with said light detecting means to provide a first indication in response to an illumination condition of both of said light detecting means, to provide a second indication in response to the illumination of neither light detecting means, and to provide at least one other indication denoting an illumination of only one of said light detecting means.

8. The angle indicator apparatus of claim 7, wherein said indicator means comprises means for providing a first audible sound and at least a second audible sound distinguishable from said first audible sound.

9. The angle indicator apparatus of claim 7, wherein said indicator means comprises a plurality of visual indicator means for providing a first visual indication and at least a second visual indication distinguishable from said first visual indication.

10. The digital angle indicator apparatus of claim 7 further comprising a plurality of additional light transmissive areas disposed on said disc and spaced radially from said axis a distance equal to the distance which said first light transmissive area is spaced from said axis and wherein said first light transmissive area, said second light transmissive area and said additional light transmissive areas are mutually spaced from each other.

11. The digital angle indicator apparatus of claim 10 wherein said plurality of additional light transmissive areas comprise two additional light transmissive areas and wherein said first light transmissive area, said second light transmissive area and said two additional light transmissive areas are mutually spaced from each other by approximately 46 degrees of arc.

* * * * *